United States Patent [19]

Harlan et al.

[11] Patent Number: 4,511,921
[45] Date of Patent: Apr. 16, 1985

[54] TELEVISION RECEIVER WITH MANUAL AND SELECTIVELY DISABLED AUTOMATIC PICTURE CONTROL

[75] Inventors: Wayne E. Harlan; James C. Marsh, Jr., both of Indianapolis, Ind.

[73] Assignee: RCA Corporation, New York, N.Y.

[21] Appl. No.: 388,971

[22] Filed: Jun. 16, 1982

[51] Int. Cl.³ .................. H04N 5/58; H04N 9/535
[52] U.S. Cl. .................... 358/161; 358/169; 358/174
[58] Field of Search .......... 358/161, 160, 169, 174, 358/27, 168, 21 R, 29

[56] References Cited

U.S. PATENT DOCUMENTS

| | | | |
|---|---|---|---|
| 3,104,281 | 9/1963 | Wolff | 178/7.5 |
| 3,147,341 | 9/1964 | Gibson | 178/7.5 |
| 3,164,673 | 1/1965 | Sharon | 178/7.5 |
| 3,165,582 | 1/1965 | Korda | 178/7.5 |
| 3,214,517 | 10/1965 | Vogt et al. | 178/7.5 |
| 3,404,226 | 10/1968 | Szeremy et al. | 178/7.5 |
| 3,928,867 | 12/1975 | Lynch | 358/39 |
| 3,961,361 | 6/1976 | Avins et al. | 358/27 |
| 4,081,838 | 3/1978 | Wheeler | 358/169 |
| 4,090,216 | 5/1978 | Constable | 358/21 |
| 4,181,916 | 1/1980 | Henderson | 358/161 |

FOREIGN PATENT DOCUMENTS

| | | | |
|---|---|---|---|
| 251887 | 5/1963 | Australia | 358/161 |
| 1201398 | 9/1965 | Fed. Rep. of Germany | 358/161 |

Primary Examiner—Tommy P. Chin
Attorney, Agent, or Firm—Eugene M. Whitacre; Paul J. Rasmussen; Ronald H. Kurdyla

[57] ABSTRACT

A source of variable DC gain control voltage for a gain controllable video display system including an image display kinescope comprises a manually adjustable potentiometer, and a variable conduction ambient light sensing device located in proximity to the kinescope display screen. A gain control voltage provided at an output terminal of the source normally varies both manually as a function of the potentiometer setting, and automatically as a function of varying conduction of the light sensing device in response to varying ambient light levels. Automatic gain control provided by the light sensing device is defeated when the potentiometer is set to an extreme position corresponding to maximum gain, so that maximum signal gain (i.e., maximum image contrast) can be produced in low ambient light conditions.

9 Claims, 3 Drawing Figures

TELEVISION RECEIVER WITH MANUAL AND SELECTIVELY DISABLED AUTOMATIC PICTURE CONTROL

This invention concerns a source of control voltage suitable for controlling the amplitude of a video signal manually via a viewer adjustable control, and automatically via an ambient light sensing device.

A video signal processing and display system such as a television receiver commonly includes a viewer adjustable control (e.g., a potentiometer) for manually controlling the peak-to-peak amplitude of television signals to achieve a desired level of contrast for a picture displayed by an image reproducing kinescope of the system. Some video display systems also include provision for automatically controlling picture contrast as a function of the ambient lighting conditions in the environment in which the displayed picture is being viewed. This is typically accomplished by means of a light sensitive variable conduction device, such as a light dependent registor (LDR) or equivalent device, which is positioned close enough to the face of the kinescope display screen so that the amount of ambient light striking the LDR is proportional to the amount of light striking the kinescope display screen. The impedance of the LDR typically varies inversely with the level of ambient light so that picture contrast increases and decreases as the ambient light level increases and decreases, respectively.

In many systems the ambient light sensing automatic picture control network produces a change in picture contrast for all settings of the manually adjustable picture control network. Thus in low ambient light it is not possible to obtain maximum picture contrast due to the dominating effect of the automatic light sensing network, which then produces reduced picture contrast.

Thus the light sensing network should be disabled for picture control purposes when it is desired to achieve maximum picture contrast via the manual control in low ambient light. This may be desired according to the personal preferences of individual viewers, or as a function of the distance between the viewer and the display screen. In the latter regard, maximum picture contrast in a dark viewing environment may be preferred as the distance from the kinescope display screen to the viewer increases (e.g., such as in showroom comparisons of television receivers).

The light sensing automatic control network can be selectively disabled by means of an appropriately connected mechanical switch accessible by the viewer. However, such a switch is costly.

It is herein recognized as desirable to provide an arrangement wherein the ambient light sensing automatic control network is disabled simply by adjusting the manual picture control to the maximum gain (contrast or picture level) position, to thereby achieve maximum picture contrast in a dark viewing environment. It is also recognized as desirable to provide such an arrangement whereby the values of circuit elements associated with the manual and automatic control networks can be tailored to achieve desired (e.g., different) gain control voltages for bright and dark ambient lighting conditions when the manual control is set to other than the maximum gain position, without affecting the desired objective of disabling the automatic control network when the manual control is set for maximum gain (contrast).

Accordingly, a source of gain control voltage disclosed herein includes a manually adjustable potentiometer, and a variable impedance network including an ambient light sensing device located in proximity to the kinescope display screen. The resistance element of the potentiometer is coupled between first and second DC operating potentials via respective first and second coupling paths. A manually adjustable control voltage derived from the wiper of the potentiometer is coupled to the output terminal of the gain control voltage source via a third coupling path. The potentiometer exhibits a maximum gain setting when the wiper is positioned at one extreme in the direction of the first operating potential. The variable impedance network is coupled between the first operating potential and the third coupling path, and normally serves to modify the output control voltage automatically as a function of ambient light levels. The impedance of the first coupling path is significantly less than the effective impedance of the variable impedance network when the wiper occupies the maximum gain position, and the impedance between the output terminal and the second operating potential is significantly greater than the effective impedance of the variable impedance network when the wiper occupies the maximum gain position, such that the gain control voltage at the output terminal is substantially unaffected by variations in the conductivity of the light sensing device in response to varying ambient light levels. Accordingly, a control voltage corresponding to maximum signal gain and picture contrast can be produced in low ambient light conditions.

Figure 1:
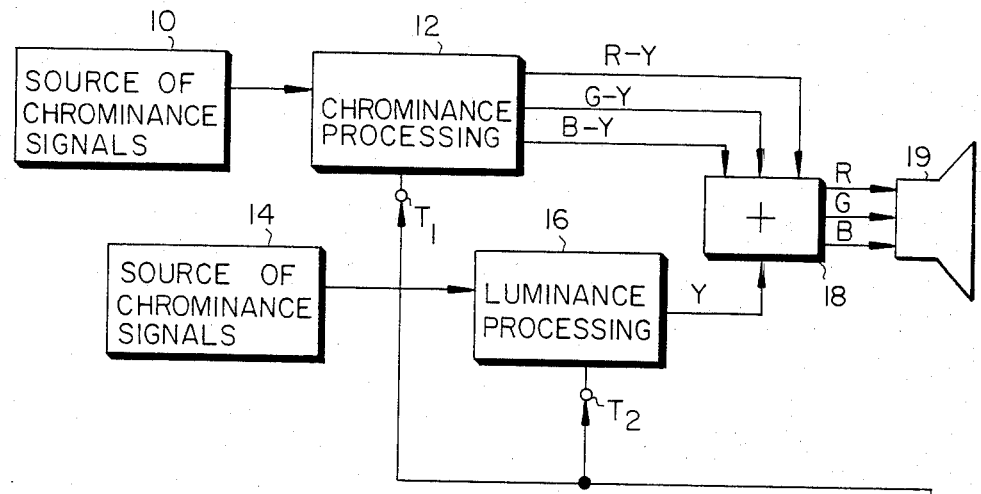
FIG. 1 shows a portion of a color television receiver including a source of variable gain control voltage, including interactive manual and automatic gain control networks, according to the present invention.
Figure 1:
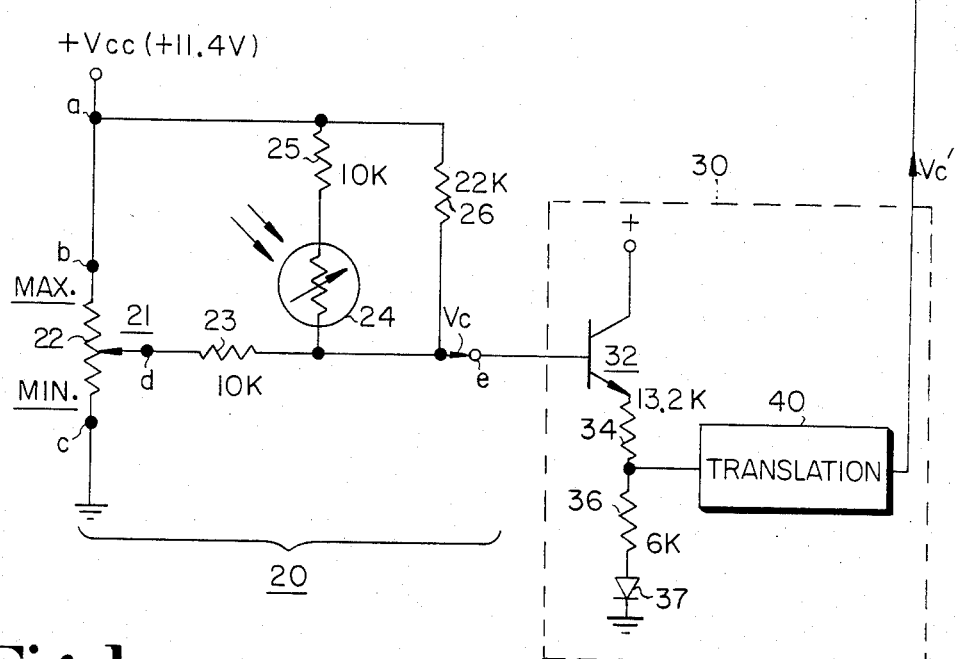

In FIG. 1, the chrominance component of a composite color television signal is supplied from a source 10 to a chrominance signal processor 12 for developing color difference signals R-Y, G-Y and B-Y. Chrominance processor 12 includes, among other conventional color signal processing circuits, a gain controllable signal amplifier which responds to a variable DC gain control voltage applied to a DC gain control input terminal $T_1$ for varying the peak-to-peak amplitude of the chrominance signal in accordance with the level of the control voltage. The luminance component of the television signal is supplied from a source 14 to a luminance signal processor 16, which provides an amplified luminance signal Y. Processor 16 includes a gain controllable signal amplifier which responds to a variable DC gain control voltage applied to a DC gain control input terminal $T_2$ for varying the peak-to-peak amplitude of the luminance signal. The signal gains of chrominance processor 12 and luminance processor 16 are controlled simultaneously to maintain a desired relationship between the amplitudes of the chrominance and luminance signals. The gain controlled luminance signal output from processor 14 and the gain controlled color difference signals from processor 12 are combined in a matrix amplifier 18 for producing color image representative signals R, G and B. A color kinescope 19 responds to these signals for reproducing a color image on the viewing screen of the kinescope.

The gain control voltages applied to chrominance processor 12 and luminance processor 16 originate from a source of gain control voltage 20 constructed according to the principles of the present invention. Control voltage source 20 includes a manually adjustable voltage divider shown as a potentiometer 21, a variable impedance network including an ambient light responsive light dependent resistor (LDR) 24, and a source of operating supply bias potential for source 20 consisting of a positive DC voltage $+V_{cc}$ ($+11.4$ volts) and an associated ground reference potential.

The positive supply potential $+V_{cc}$ is applied to a node "a". The manually adjustable voltage divider, potentiometer 21, is defined by a fixed resistive element 22 between nodes "b" and "c", and an adjustable wiper connected to a node "d". Potentiometer 21 is coupled via node b to the positive operating supply potential $+V_{cc}$, and via node c to the ground reference potential. A variable voltage developed at wiper node d is coupled to an output terminal "e" of source 20 via a wiper voltage coupling path. Maximum gain is produced when potentiometer 21 is set to the MAX position (i.e., when the wiper is connected to $+V_{cc}$ via node b). Minimum gain is produced when potentiometer 21 is set to the MIN position (i.e., when the wiper is connected to ground via node c).

The variable impedance network, including LDR 24 and resistors 23, 25 and 26, is coupled between the wiper voltage path and the positive operating supply. The variable impedance network automatically varies the control voltage at output terminal e as a function of the level of ambient light in the viewing area by means of LDR 24. Desirably LDR 24 is positioned close to the display screen of kinescope 19 so that the amount of ambient light striking LDR 24 is proportional to the amount of light striking the kinescope display screen.

A gain control voltage $V_c$ developed at output terminal e of source 20 is applied via a high input impedance signal coupling and level translating network 30. The input circuit of network 30 comprises an emitter follower transistor 32 with resistors 34, 36 and a diode 37 coupled in series in the emitter circuit of transistor 32. By way of example, if transistor 32 exhibits a current gain (Beta) of approximately 100, whereby transistor 32 exhibits a base input impedance of approximately 1.9 Megohms with the values shown for emitter resistors 34 and 36. A gain control voltage derived from the emitter circuit of transistor 32 is level shifted by means of a translating network 40 to produce a level shifted version $V_c'$ of gain control voltage $V_c$, suitable for application to the DC gain control inputs of chrominance processor 12 and luminance processor 16. Translating network 40 may not be required in all systems, and some systems may include separate gain control voltage translating circuits respectively included in the gain control input circuits of the luminance and chrominance processors.

The operation of gain control voltage source 20 will now be described with reference to FIG. 1 in conjunction with FIG. 2, which shows the response of the control voltage source as a function of the setting potentiometer 21 and ambient light conditions.

Figure 2:
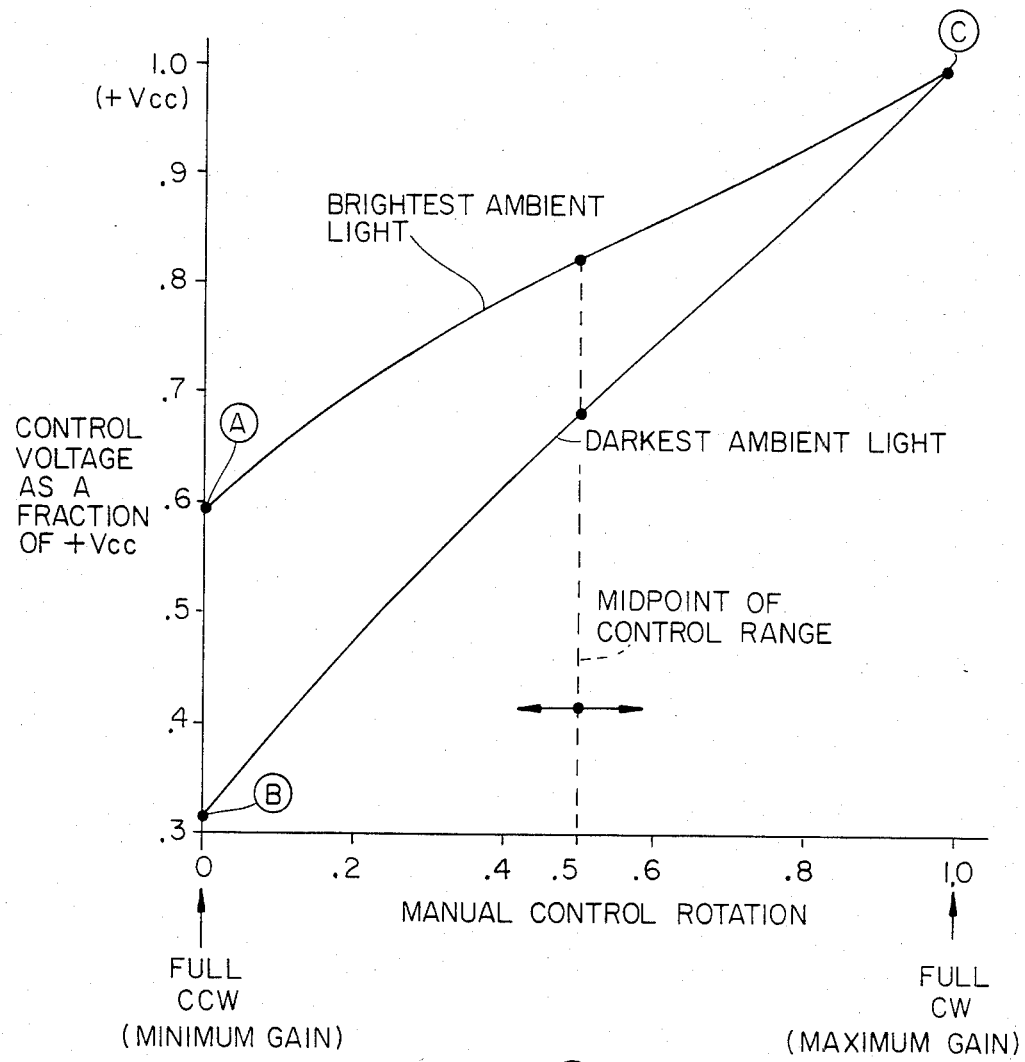
FIG. 2 illustrates the response of the control voltage source as a function of ambient light and the setting of a viewer adjustable manual control.

In FIG. 2, the curve between A and C illustrates the response of gain control voltage $V_c$ at output terminal e for bright ambient lighting conditions, when LDR 24 exhibits a normally expected minimum impedance. For this lighting condition minimum gain is produced when the control voltage exhibits the level designated by point A when potentiometer 21 is rotated to a fully counterclockwise (CCW) extreme position, and maximum gain is produced when the control voltage exhibits the level designated by point C when potentiometer 21 is rotated to a fully clockwise (CW) extreme position. The curve between B and C illustrates the response of gain control voltage $V_c$ for dark ambient lighting conditions, when LDR 24 exhibits a normally expected maximum impedance. For this lighting condition minimum gain is produced when the gain control voltage exhibits the level designated by point B, and maximum gain is produced when the control voltage exhibits the level designated by point C.

Thus from FIG. 2 it is seen that maximum gain is produced for both bright and dark ambient light conditions simply by rotating potentiometer 21 to the maximum gain position (MAX). For both of these ambient light conditions the level of gain control voltages $V_c$ is substantially equal to $+V_{cc}$. Maximum gain is also produced for intermediate ambient lighting conditions when control 21 is set to the MAX position. This result is produced due to LDR 24 being disabled for automatic gain control operation, notably under low ambient light conditions, when control 21 is set to the MAX position, whereby LDR 24 is unable to automatically reduce signal gain under low lighting conditions. The mechanism by which this is accomplished will now be discussed with reference to FIG. 1.

In FIG. 1, maximum gain is produced when the wiper of potentiometer 21 is set to the MAX position, whereby wiper node d is connected to the $+V_{cc}$ operating supply via a coupling path between nodes b and a shown as a wire by way of example. The value of the impedance of the coupling path between nodes b and a is significantly less than the value of resistive element 22 of potentiometer 21, and is also significantly less than the equivalent impedance of the variable impedance network including LDR 24 and resistors 23, 25, 26 for all impedance values of LDR 24, particularly under dark ambient lighting conditions. As shown, coupling path b-a preferably exhibits a substantially zero impedance such that there is essentially no voltage drop or voltage offset developed across it. Under normally expected bright (maximum) ambient light conditions, LDR 24 (e.g., a cadmium sulfide device) exhibits a relatively small impedance on the order of 100 ohms, at which time the effective impedance of variable impedance network 23–26 is approximately 4 kilohms. LDR 24 exhibits a relatively large impedance on the order of several megohms under normally expected dark (minimum) ambient light conditions, at which time the effective impedance of the variable impedance network is approximately 6.9 kilohms. For average viewing conditions in a moderately well-lighted viewing area LDR 24 exhibits an impedance of approximately 1 kilohm.

When potentiometer 21 is set to the maximum gain position (MAX), variations is the impedance of LDR 24 in response to changing ambient light levels have substantially no effect on the level of control voltage $V_c$ since at this time there is no potential difference across LDR 24, and substantially no current flows in LDR 24 in response to variations in ambient light. At this time network 20 exhibits a high impedance between output terminal e and ground such that voltage divider action at output terminal e in response to the operation of LDR 24 is substantially prevented. As a result, maximum signal gain results even under relatively dark ambient light conditions. Thus variable voltage divider action in response to ambient light changes is precluded when potentiometer 21 is set for maximum gain. Accordingly, the signal gains of both chrominance processor 12 and luminance processor 16 are unaffected by LDR action when potentiometer 21 is in the maximum gain position.

The described arrangement of gain control voltage source 20 is advantageous in that the values of resistors 23, 25 and 26 can be tailored to suit the automatic gain control requirements of a particular system, without disrupting the desired effect of achieving maximum signal gain under dark ambient light conditions. In this regard it is noted that the values of resistors 23 and 26 determine the minimum gain control voltage level for dark ambient light conditions (point B in FIG. 2). The value of resistor 23 in combination with the values of resistors 25 and 26 determine the minimum gain control voltage level for bright ambient light conditions (point A in FIG. 2).

In many gain control arrangements it is desirable to achieve reproducible gain control operation such as symmetrical gain control whereby mutually equal amounts of increasing and decreasing signal gain are produced with respect to the mechanical mid-range setting of the control potentiometer. In this regard it is noted that potentiometer 21 is connected across the fixed operating bias supply (i.e., between $+V_{cc}$ and ground) without intervening circuit elements, since potentiometer nodes b and c are directly connected to $+V_{cc}$ and ground, respectively. With this connection, reproducible gain control operation is not upset by the tolerance of the resistance value of the potentiometer, which can vary by ±30% from one potentiometer to another. Thus if potentiometer 21 has a tolerance of ±30% and is replaced by another unit, the substantially symmetrical gain control operation, with respect to the midpoint setting of potentiometer 21 as shown in FIG. 2, will be unaffected.

Gain control voltage source 20 generates a DC gain control voltage which is applied to DC gain control inputs of the video signal amplifiers being gain controlled via translating network 30. Gain control voltage $V_c$ can also be applied directly to an appropriate high impedance DC gain control input of the amplifier being gain controlled (i.e., in the absence of an intervening translating network such as network 30). Thus in the case of a differential amplifier which receives input signals via the interconnected emitters of differentially connected amplifier transistors, control voltage $V_c$ can be applied to the high impedance base electrodes of the amplifier transistors for differential gain control.

Figure 3:
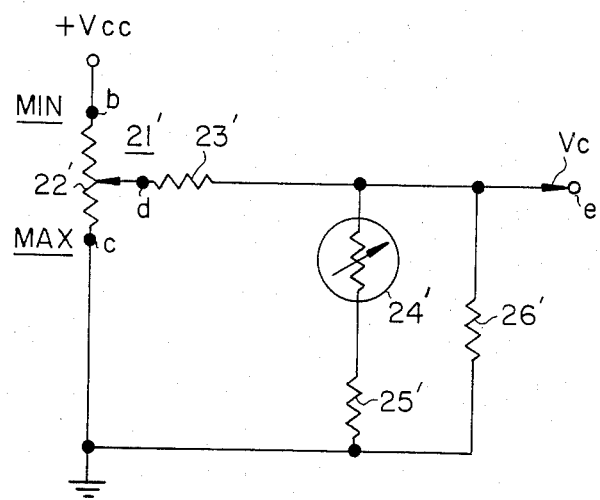
FIG. 3 shows an alternative version of the gain control voltage source of FIG. 1.

FIG. 3 illustrates an alternative version of gain control voltage source 20 shown in FIG. 1. In FIG. 3, potentiometer 21', LDR 24' and resistors 23', 25' and 26' functionally correspond to counterpart elements 21, 24, 23, 25 and 26 of FIG. 1. The arrangement of FIG. 3 differs from that of FIG. 1 in that, in FIG. 3, maximum gain is produced when the wiper of potentiometer 21' is set to the MAX position at node c, which is directly connected to ground reference potential. Thus when potentiometer 21 is set for maximum gain, there is substantially no potential difference across LDR 24' whereby substantially no current flows in LDR 24' even when the impedance of LDR 24' varies in response to changing ambient light conditions. Maximum gain is therefore produced under dark ambient lighting conditions. In this case gain control voltage $V_c$ is applied to luminance and chrominance signal processing circuits 16 and 12 with the proper polarity (e.g., via a signal inverting network within translating network 40).

What is claimed is:

1. In a video signal display system including a signal processing channel; an imange reproducing kinescope for producing an image display on a viewing screen thereof in response to output signals from said signal processing channel; and a light responsive variable conduction device positioned with respect to said kinescope viewing screen such that substantially proportional amounts of ambient light strike said light responsive device and said kinescope viewing screen; a source of variable DC gain control voltage for controlling the gain of said signal processing channel, comprising:

a first DC operating potential;
   a second DC operating potential;
   a manually adjustable potentiometer including a resistance between first and second nodes, and an adjustable wiper slideably connected to said resistance and adjustable between said first and second nodes; said potentiometer exhibiting a maximum gain setting when said wiper is positioned at said first node, and exhibiting a minimum gain setting when said wiper is positioned at said second node;
   a first coupling path for coupling said first potentiometer node to said first DC potential;
   a second coupling path for coupling said second potentiometer node to said second DC potential;
   a third coupling path for coupling said potentiometer wiper at which a manually variable gain control voltage is produced according to the position of said wiper, to a gain control voltage output terminal of said gain control voltage source; and
   a variable impedance network, including said light responsive device, coupled from said first operating potential to said third coupling path; wherein
   (a) the impedance of said first coupling path is significantly less than the effective impedance of said variable impedance network when said wiper is positioned at said first potentiometer node to produce a maximum gain condition, and
   (b) the impedance between said output terminal and said second operating potential is significantly greater than the effective impedance of said variable impedance network when said wiper is positioned at said first potentiometer node to produce a maximum gain condition, such that the gain control voltage at said output terminal is substantially unaffected by variations in the conductivity of said light responsive device in response to varying ambient light levels when said wiper is positioned at said first potentiometer node.

2. An arrangement according to claim 1, wherein said first coupling path exhibits a negligible impedance such that said first potentiometer node is coupled to said first operating potential with substantially zero offset voltage.

3. An arrangement according to claim 1, wherein said first and second coupling paths exhibit a negligible impedance such that said first and second potentiometer nodes are respectively coupled to said first and second operating potentials with substantially zero offset voltage.

4. An arrangement according to claim 1, wherein the impedance path between said output terminal of said gain control voltage source and said second operating potential consists of an impedance path defined by the impedance of said third coupling path and the impedance between said wiper and said second operating potential.

5. An arrangement according to claim 4, wherein said first coupling path exhibits a negligible impedance such that said first potentiometer node is coupled to said first operating potential with substantially zero offset voltage.

6. An arrangement according to claim 5, wherein operating bias for said gain control voltage source is provided by means consisting of said first and second DC operating potentials.

7. An arrangement according to claim 1, wherein said first coupling path exhibits a negligible impedance such that said first potentiometer node is coupled to said first operating potential with substantially zero offset voltage;
a first resistor is included in said third coupling path between said wiper and said output terminal; and
the impedance between said output terminal and said second operating potential consists of the impedance of said third coupling path, including said first resistor, and the impedance between said wiper and said second operating potential.

8. An arrangement according to claim 7, and further comprising:
a second resistor connected from said first operating potential to said third coupling path.

9. An arrangement according to claim 8 and further comprising:
a third resistor connected in series with said light responsive device between said first operating potential and said third coupling path.

* * * * *